United States Patent Office 3,335,014
Patented Aug. 8, 1967

3,335,014
PROCESS FOR THE PRESERVATION OF
FOODS WITH NITROUS OXIDE
Carlo Balestra, Lugano, Switzerland, assignor to
Nitrox S.A., Lugano, Switzerland
No Drawing. Filed Sept. 16, 1963, Ser. No. 309,318
Claims priority, application Switzerland, Nov. 9, 1963,
9,257/63
15 Claims. (Cl. 99—150)

It is known that preserved foods are subject to two kinds of deterioration: the one of biological character, and the other of chemical character. The first kind of deterioration is due to bacterial action, and is not of interest for the purpose of this patent application, nor for the relating protecting processes.

The alteration of a chemical kind is due to the action of the oxygen of the air, and to internal reactions of the constituents or substances of the food in question. These alterations of a chemical nature take place unaffected by the sterilization of the substances, and unaffected also by the type of the wrapping used and within which the food is packed, and whether or not said wrapping is more or less hermetically closed.

They occur in various forms a few of which are harmful, while the others, although being harmless, give a disagreeable savour to the food, or modify the properties of the latter, so as to render the food unacceptable as not being suitable for human consumption.

The alterations of this kind occur in particular and in preponderant manner in those substances which include chemical double bonds, f.i. good quality greases, or functional groups of alcohols, aldehydes or ketones, such as are found in almost all substances which impart a characteristical aroma to the various kinds of food stuffs.

Typical examples of such changes are the rancidity of butter and other greases, the changing of colour of fresh and salted meats, the "chicory savour" of roasted and preserved coffee, the "blackening" of fresh vegetables and fruits, and the usually, ordinary savour of mustiness of the canned goods, which make almost all foods preserved with components and in accordance with the well known old processes of the same taste.

Up to now the technique of the preservation of foods has taken recourse to various processes in order to hinder the alterations of chemical nature.

One such process comprises the addition of anti-oxidizing agents (disulphides, ascorbic acid and the like), which substances are generally not innocuous for the human body, and modify the structure and the taste of the goods.

A further such process has the purpose of preventing contact with air after immersion of the foods into adapted solutions, as liquid or molten greases, or gelatine, specially prepared for the preservation of meats. In the same process, for the preservation of fruits and vegetables in a more or less "natural state," "treatment liquids" are used and comprise water with salt or sugar, or both, in order to render it isotonic with the product. The immersion into greases or liqiuds acts so that all the products to be preserved assume the same character; f.i. roasted or boiled meats enveloped in gelatine are submitted to an equal process of maceration and extraction, which makes them practically identical as to their taste and consistency. Also treating liquids used for vegetables exert the same action of maceration and extraction. These greases and liquids for treatment add further weight to the therewith preserved goods, the proportion of which is up to 40 to 50% and more, thus causing a considerable increase in the costs of preservation. Finally, the air itself tends to react therewith.

A further process is that of the preservation under vacuum, which also did not give satisfactory results. In cases of wet preserved foods, the vacuum reached is limited by the vapor pressure of the liquid in the preserved goods, consequently this process could be applied only to dried or almost dry products, because otherwise only a partial vacuum could be attained and without evacuation of a sufficient quantity of air. Industrial processes in this field tend to obtain the maximum quantity of finished products in the shortest period of time; thus the time left for the preparation of the foods under vacuum is always too short and insufficient in particular when the goods to be preserved are of porous structure as, for instance, roasted coffee. On the other hand, to use high vacuum in order to have a satisfactory effect would make the preservation of foods prohibitively expensive. Thus, a certain quantity of air always remains in the preserved foods, which amount is still sufficient to provoke the alteration of the product, so that it is indispensable to constantly apply for preservation a low temperature, and this causes a considerable increase in the cost of operation. In said preservation method based on the use of vacuum, the foods composed of a large proportion of water will be subjected to evaporation of a portion of such water, which condenses and due to remaining enclosed within the wrapping, will produce a liquor of disagreeable appearance, so that in the case of unsterilizable foods, as salted meats and cheeses, anaerobic fermentations of putrefactive character are caused.

Still another known process for the preservation of foods comprises the placing of the foods into inert room, f.i. into an atmosphere of inert gas, thus substituting the air, by using f.i. nitrogen. This method has the same drawbacks as the preservation under vacuum, inasmuch as the replacing of the air contained therein by inert gas in never complete, while furthermore this gas is not capable of hindering the action of the oxygen.

In all the aforesaid processes further reciprocal reactions of the elements contained within the foods preserved are not impeded at all.

This invention relates to a process for the preservation of foods by submerging the latter into a protecting atmosphere constituted in total or in part by nitrous oxide.

The use of nitrous oxide has been experienced for several years. The researchers in this field appear to have taken a wrong approach, that is to say that the searchers have considered the use of nitrous oxide as bactericide. Nitrous oxide was in fact used in Germany during the World War of 1914–18 as bactericide under pressures varying between 30 and 40 atmospheres. Such use of nitrous oxide as bactericide has been described by H. Bart in the paper, "Archiv für Hygiene," vol. 91, page 1 (1922).

Similar experiments were carried out by Prof. Pietro Benigno, who described his work in the paper, "Rivista Italiana di Igiene" (1942, No. 7, page 470). All these studies reached only the conclusion that the use of nitrous oxide as bactericide is only possible at pressures varying between 28 and 50 atm. The work of Prof. Benigno also ends with the important conclusion that nitrous oxide is wholly innocuous to the human organism, and completely leaves the product treated when the latter is exposed to the atmosphere.

In accordance with the present invention, the nitrous oxide ($N_2O$) is, contrary to the above information, used for the preservation of foods against chemical alterations with results which have largely surprised the technical experts due to their great importance inasmuch as the nitrous oxide acts as an activating gas in this specific field. An explanation of this protective action of nitrous oxide may be taken from the consideration of the apolar character of its molecule, due to which it shows a greater solubility in the apolar components (as greases, alcohols, aldehydes, ketones). It may be that due to the saturation of a food stuff with this gas there are created molecular attachments of nitrous oxide onto the apolar components contained in the food, which form a kind of barrier against the oxygen, just with respect to the components which are the most easily oxidizable. Said barrier may be overcome by the oxygen only under specific conditions, as will be described in the following.

A further important feature of the nitrous oxide is that its protective action against oxidation and chemical reactions of the food stuffs is independent of the temperature, for which it may be used very well at room temperature (20–40° C.), and also at a lower temperature, of course. Said protective action is further not at all dependent on the pressure. The said inhibiting action is exerted also when the nitrous oxide saturated room contains a percentage of oxygen under partial pressure or in volume less than 20% in respect of the nitrous oxide of course, this percentage of the oxygen may vary between large limits, but without exceeding said maximum of 20%, this depending on the nature and quality of the food stuff to be preserved, and on the greater or lesser capacity of being oxidized, this permissible proportion of oxygen being of great importance because such a tolerance for the oxygen permits a much more extended industrialization of the process according to this invention, due to the simplification and acceleration of all its steps, in particular the substitution of the air in the containers, whereby any indispensability of utilizing an extremely high degree of vacuum is advantageously avoided.

A further property of the nitrous oxide is its protective action which is achieved also in presence of other inert gas or gases. In this case, when oxygen is also present, the partial pressure of it will but not exceed the aforementioned 20% in respect of the nitrous oxide.

From the above informations it appears quite clearly that food stuffs can very well be preserved at room temperature, thus also avoiding the cost of the otherwise required freezing or refrigerating. The fact that the action of the nitrous oxide is not at all dependent on any absolute pressure whatever allows to realize the process of the present invention with whatever type and capacity of receptacle from the smallest bag line to the greatest and largest silo or the like, with the only requirement that the same be impervious to the passage of the nitrous oxide. Thus the container may be made not only of metal, but also of other laminated materials, plastic and/or derivatives, or paper impregnated with synthetic solutions.

The process of the present invention can be carried out in an economical manner inasmuch as the proportion of nitrous oxide per litre or cubic decimeter of the product to be preserved is not high at all. As a matter of fact, the nitrous oxide has a solubility in water, at 15° C., of 0.75 volumes per volume of water, while in greases its solubility is equal to 1.5 volumes per volume of grease; consequently, also supposing that the total mass of the products should dissolve nitrous oxide, and that the mass should consist entirely of grease, and further supposing a consumption of gas of 33%, the maximum amounts of gas will be about 4 g. (2 litres at normal pressure) per litre or cubic decimeter of food stuff to be preserved. Furthermore, excess gas, also when mixed with other gases, as air or nitrogen, or still another may be easily recuperated by liquifying, and recycling, thus ensuring an accordingly high yield of the process of the present invention.

About the economy of the system, the fact that the necessary apparatuses for carrying out the process are not complicated and therefore not costly as compared with those used in the former treatment methods for working in inert gas or gases, is of a considerable advantage.

A further main advantage of using nitrous oxide for the protection of food stuffs against chemical alterations is that this gas is very well adapted to work in combination with the modern system of sterilization, wherein radio-active isotopes, due to their own properties, do cause enzymatic or oxidative reactions in the food stuffs, the nitrous oxide thus preventing these disadvantageous reactions.

The formation of the nitrous oxide atmosphere can be carried out either during the introduction of the food stuff into its container, or at the instant of stocking into silos or types of warehousing cells, which will have to be hermetically closed when the food stuff has not to be submitted to sterilization, as it is the case with butter or roasted coffee, or for a provisional preservation, as for fresh fruits and vegetables. In this last case, the stuff may be preserved under a slight pressure of nitrous oxide (a few of tenths of one atmosphere only) and conveyed directly to the packing machines working in a nitrous oxide atmosphere.

Although the process of this invention can be applied at superatmospheric or subatmospheric pressures, the preferred pressure limits are between one and six atmosphere absolute.

The introduction of the nitrous oxide can be arranged either by effecting a vacuum for the evacuation of the air, f.i. till a residual pressure of 110 mm. of Hg, and by re-establishing normal pressure or a slight over pressure by means of the nitrous oxide itself as well, or by means of repeated washing operations and the compression of the gas deprived of oxygen (f.i. nitrogen, sulphur dioxide, and the like) and successive exhausting, successively eliminating the quantity of gas fed by sucking and reintegrating to the atmospheric or the pre-established pressure, under addition of nitrous oxide (which procedure is especially adapted for the preservation of coffee), or still by means of successive washing operations under pressure with nitrous oxide and successive exhausting as well, until such an amount of air has been exhausted that the partial pressure of the oxygen will be brought within the allowed limits, as hereabove specified.

A few examples of embodiments and results of practical experiments are described, as follows:

*Example I*

From a batch of coffee roasted the preceding day, nine samples of 300 g. each were taken and divided into three groups identified as (*a*), (*b*) and (*c*). The three groups of samples were placed into receptacles and the latter were then hermetically closed. The samples of each group were prepared in different manners as follows:

Group (*a*) was prepared by exhausting air from the respective receptacles until the residual absolute pressure was equal to 110 mm. Hg, and thereafter the receptacles were hermetically closed.

Group (*b*) was prepared by exhausting air from the respective receptacles until the residual pressure amounted to 110 mm. Hg, and thereafter gaseous nitrogen was introduced until an absolute pressure of 1.1 atmospheres was reached. Thereafter the receptacles were hermetically closed.

Group (*c*) was prepared by exhausting air from the respective receptacles until the residual pressure amounted to 110 mm. Hg, and thereafter nitrous oxide was introduced until an absolute pressure of 1.1 atmospheres was reached. This was again followed by hermetically sealing of the receptacles.

At spaced time intervals, one sample of each of the three groups was examined with the following results:

After one month:

The sample of group (*a*) had a slight odor of rancidity.

The sample of group (*b*) had the same odor.

The sample of group (*c*) did not show any change as compared with its state of preservation at the time of sealing of the receptacles.

After three months:
The sample of group (a) had a heavy odor of rancidity.
The sample of group (b) had the same odor.
The sample of group (c) still appeared unchanged.

At this point, experts declared the samples of groups (a) and (b) to be no longer suitable for consumption.

Of the sample of group (c) a conventional coffee drink was prepared by the conventional infusion method and at the same time, for comparison, a similar drink was prepared of powdered coffee which had been roasted the preceding day. No difference was noticed between these two coffee drinks.

After seven months:
The sample of group (a) had an extremely heavy odor of rancidity.
The sample of group (b) had the same odor.
The sample of group (c) was still in perfect condition of preservation and a drink prepared therefrom was comparable with a coffee drink prepared of powdered coffee roasted the day before.

Example II 80 kg. of coffee roasted the day before were divided in 20 receptacles under hermetic closure, that is to say each receptacle containing 4 kg. of coffee; all receptacles were left closed two days; successively the gas which had been developed within the receptacles was exhausted, and a vacuum of 160 mm. of Hg was applied. Then nitrous oxide was added until an absolute pressure of 1.1 atm. was reached.

After a time of six months and five days, the receptacles were opened and of their preserved contents coffee drink portions were prepared in usual manner by infusion, and distributed to consumers not acquainted with the origin of the powdered roasted coffee. No remarks as to the usual taste of coffee drinks were noted, which is an indication that no change had taken place in the thus preserved coffee.

Example III

On the market four bags of pork meat packed under vacuum were purchased, each weighing about 150 g., namely two of sliced "salami" and two of sliced salted fresh bacon, of the not too fatty quality. One bag of sliced "salami" and one bag of sliced bacon were maintained in their original package at room temperature, while the other two bags were opened and their contents distributed separately slice by slice into a glass made receptacle. The latter was hermetically closed, and saturated with nitrous oxide introduced through a suitable cock. The internal pressure reached was 1.5 absolute atmospheres; then the gas was exhausted until ambient pressure was reached. This operation was repeated three consecutive times and at the end a superpressure of 25 cm. water column was retained within the receptacle. All samples were left near one another in the same room, the temperature of which was at the beginning 38° C., and was successively lowered to 25° C. After a three months period all containers were opened, and the results were, as follows:

The sliced pork meats of the original bags showed a yellowish color of the fatty parts, whilst the meat itself had acquired a greyish color; further within the bags drops of a muddy liquor were found. In contrast thereto, the nitrous oxide treated samples did not show any change whatever either in their color, or in their consistency and savor. While the first samples on opening their bags showed a heavy odor of rancidity and a background of putrefaction odor, the nitrous oxide treated samples had maintained their good odor of fresh sliced pork meat, and the characteristic one of "salami" and bacon, so that they could be eaten without any impairment of the health of the consumers each having consumed one hundred grams of these products.

Example IV

From the trade there were purchased two packages of fresh butter; the covering paper was taken away and both pieces of butter were divided into two halves each; two portions of the two different packages were submitted to saturation with nitrous oxide until a pressure of 1.05 absolute atm. was reached, after preceding evacuation to a residual pressure of 110 mm. of Hg, while the other two samples were hermetically enclosed in a glass vessel. All butter halves were put in the same room at a temperature varying between 25° C. and 28° C.

After a period of five months all butter samples were examined with the following result: the butter treated with nitrous oxide was intact, that is without any change in color, consistency and savor, while the two untreated samples were no longer edible, due to their heavy rancidity.

Example V

A further experiment was carried out with sardines purchased from the trade. The contents of a usual commercial tin, preserved in oil were divided into two portions. The sardines were separated from the oil by draining, and enclosed in two receptacles which were hermetically closed; in one of them the saturation with nitrous oxide was provided for at 1.1 atm. absolute pressure, after preceding evacuation to 160 mm. of Hg, while the other receptacle with the second portion of sardines was used for comparison. Both of the hermetically closed receptacles were subjected to simultaneous sterilization in a vacuum boiler.

After having left said receptacles for 120 days at a temperature varying between 25° C. and 28° C., they were opened and the following results were found:

The nitrous oxide treated sardines had maintained their original color, odor and savor;

The sardines of the other receptacle had assumed a color tending to orange color, had a very heavy odor of codliver oil, and were surely not edible.

Example VI

In order to check the innocuity of the process of this invention with respect to the possibility of stopping biological reactions, 39 covering eggs, which had been fertilized, were divided into two groups; the first group of 20 such eggs was put into a receptacle which was hermetically closed and saturated with nitrous oxide containing also 10% oxygen per volume; the saturation took place three times consecutively, every time after exhausting the gas from within a receptacle, at the absolute pressure of 1.5 atm.; the final pressure left in the receptacle was 1.1 atm. The second group of 19 eggs was left exposed to the air in the same room wherein the nitrous oxide treated eggs were placed, at a temperature of 18–20° C. After 20 days the eggs of both groups were submitted to incubation and on their opening there were registered 12 chicks from the first group of eggs and 9 from the second one which had been exposed to the air.

The chicks of both groups, observed for the successive 14 days, did not show any difference as to vitality, vivacity and general life activity.

What I claim is:
1. A method of preserving food stuffs, comprising the steps of introducing said food stuff into a hermetically sealable enclosure so as to fill said enclosure but partly; filling the residual space in said enclosure with a protective gas including an effective amount of nitrous oxide and being free of oxygen in excess of an amount equal to 20% of the volume of said nitrous oxide, said gas being maintained in said enclosure at an absolute pressure of up to about 1.1 atmospheres; and hermetically sealing said enclosure.

2. A method as defined in claim 1, wherein said gas consists essentially of nitrous oxide.

3. A method as defined in claim 1, wherein said gas consists essentially of a mixture of air and nitrous oxide, the proportion of air in said mixture being such that the total oxygen content of said mixture is equal to up to 20% by volume of the nitrous oxide content thereof.

4. A method as defined in claim 1, wherein said protective gas consists essentially of a mixture of nitrous oxide and at least one gas which is inert with respect to said food stuff.

5. A method as defined in claim 1, wherein said sealed enclosure is subjected to radiation sterilization.

6. A method as defined in claim 5, wherein said radiation sterilization is carried out by means of radio-active isotopes.

7. A method as defined in claim 1, wherein said enclosure is a silo.

8. A method as defined in claim 1, wherein said enclosure is a food container.

9. A method as defined in claim 1, wherein said enclosure is a bag impervious to nitrous oxide.

10. A method as defined in claim 1, wherein said filling of said residual space with said protective gas is carried out by partial evacuation of said enclosure and subsequent introduction of said protective gas so as to substantially restore atmospheric pressure in said enclosure.

11. A method as defined in claim 1, wherein said filling of said residual space with said protective gas is carried out by successive purgings of the interior of said container with inert gas, at least partially exhausting the last introduced inert gas, and thereafter introducing said protective gas into said enclosure.

12. A method as defined in claim 1, wherein said filling of said residual space with said protective gas is carried out by successive purgings of the gas filling said residual space with nitrous oxide until the desired partial pressure of nitrous oxide is reached.

13. A method as defined in claim 12, wherein nitrous oxide is recovered from the purged gas, and the thus recovered nitrous oxide is recycled for subsequent use as purging gas.

14. A food package, comprising, in combination, a closed container; a food stuff enclosed in said container filling the same but partly so as to define a gas space within said container; and a protective gas at an absolute pressure of up to about 1.1 atmospheres and including an effective proportion of nitrous oxide, filling said gas space.

15. A food package as defined in claim 14, wherein said protective gas includes oxygen in an amount equal to up to 20% by volume of the nitrous oxide content thereof.

References Cited
UNITED STATES PATENTS

| | | | |
|---|---|---|---|
| 1,017,144 | 2/1912 | Gironcoli | 99—189 |
| 1,250,079 | 12/1917 | Bart | 99—189 |
| 1,538,369 | 5/1925 | Aklyama | 99—225 |
| 2,925,346 | 2/1960 | Harper | 99—189 |
| 2,930,703 | 3/1960 | Harper | 99—159 |
| 2,952,541 | 9/1960 | Fayhee | 99—150 |

OTHER REFERENCES

Food Industries, New Bag Preserves Flavor With Inert Gas, January 1940.

A. LOUIS MONACELL, *Primary Examiner.*

HYMAN LORD, *Examiner.*

M. A. VOET, *Assistant Examiner.*